United States Patent [19]

Bates et al.

[11] Patent Number: 4,972,135
[45] Date of Patent: Nov. 20, 1990

[54] SWITCHING SYSTEM FOR BATTERY JUMPER CABLES

[76] Inventors: Bobby L. Bates, 931 W. Cienega, San Dimas, Calif. 91773; Wesley V. Bates, 1409 Bonita Ave., La Verne, Calif. 91750

[21] Appl. No.: 389,843

[22] Filed: Aug. 4, 1989

[51] Int. Cl.[5] .............................................. H02J 7/00
[52] U.S. Cl. ........................................ 320/25; 320/2
[58] Field of Search ................................ 320/25, 26, 2

[56] References Cited

U.S. PATENT DOCUMENTS

| | | |
|---|---|---|
| 3,200,219 | 8/1965 | Pollack ............................ 320/26 X |
| 3,259,754 | 6/1966 | Matheson . |
| 3,659,183 | 4/1972 | Carlson . |
| 4,144,483 | 3/1979 | Thornley ............................ 320/25 |
| 4,145,648 | 3/1979 | Zender . |
| 4,157,492 | 6/1979 | Colbrese . |
| 4,163,134 | 7/1979 | Budrose . |
| 4,166,241 | 8/1979 | Grant . |
| 4,180,746 | 12/1979 | Guiffra . |
| 4,238,722 | 12/1980 | Ford . |
| 4,272,142 | 6/1981 | Zapf . |
| 4,286,172 | 8/1981 | Millonzi et al. . |
| 4,349,774 | 9/1982 | Farque ............................ 320/25 |
| 4,366,430 | 12/1982 | Wright . |
| 4,400,658 | 8/1983 | Yates . |
| 4,488,147 | 12/1984 | Signorile . |
| 4,527,111 | 7/1985 | Branham . |
| 4,746,853 | 5/1988 | Ingalls . |
| 4,769,586 | 9/1988 | Kazmierowicz . |

Primary Examiner—R. J. Hickey
Attorney, Agent, or Firm—Christie, Parker & Hale

[57] ABSTRACT

A battery jumper-cable interconnecting system with a pair of mechanically activated high-current switches, one of which is closed to connect charged and discharged batteries in correct polarity without regard to positioning of the jumper cables. The appropriate switch to activate is determined by an automatic polarity-sensing circuit which provides a visual signal to the user by unlatching and moving the correct switch to an unlocked position, while maintaining the incorrect switch in a latched and locked position.

6 Claims, 6 Drawing Sheets

SWITCHING SYSTEM FOR BATTERY JUMPER CABLES

BACKGROUND OF THE INVENTION

Jumper cables are in common use for temporary connection of a charged storage battery in parallel with a weak or discharged battery. Many motorists carry such cables to enable "jump" starting of a car with a dead battery by using the charged battery of an adjacent vehicle. Once started, the generator or alternator provides sufficient energy to operate the vehicle and to recharge its depleted battery, and the jumper cables are disconnected.

The simplest form of a jumper-cable system is a pair of heavy (high-current) cables terminated at opposite ends in clamps for connecting the cables to terminal posts on the batteries. The problem with such simple systems is that it is both possible and easy to connect the batteries in reverse polarity which may damage one or both batteries, and even result in a hazardous battery explosion.

This problem has resulted in the availability of switch-protected jumper-cable systems which detect and signal correct (or incorrect) cable-battery connections before closing the circuit between the batteries. Signaling of a correct connection is typically done with simple pilot light and diode circuits, and switching by high-current devices such as automotive starter relays or massive plug-socket connectors as suggested in U.S. Pat. Nos. 4,166,241 and 4,272,142.

Some known jumper-cable systems are deficient or overly complex in assuring proper connections of correct polarity, and the starter-relay circuits present problems in that such relays are designed for only momentary activation during the cranking phrase of engine startup. These relays quickly overheat when used for jumper-cable switching of heavy starting currents, leading to short life and poor reliability.

The system of this invention overcomes these problems by providing accurate polarity determination, and by eliminating the commonly used starter relays which are susceptible to overheating and failure. Broadly, the new system is an optimized combination of electrical circuitry for polarity sensing, and a pair of latched heavy-duty mechanical switches which readily withstand heavy current without overheating. The polarity-sensing circuitry unlatches only one of the switches to insure correct interconnection of the batteries, and that switch is then manually actuated to complete the connection. The system is simple for an inexperienced person to operate, and is primarily intended for permanent installation in the user's automobile, either as original equipment, or as a subsequently installed accessory.

SUMMARY OF THE INVENTION

The system of this invention includes a pair of switch means which are double-pole high-current manual switches. One of the switches is actuable to interconnect charged and discharged batteries in correct polarity when associated jumper cables are connected to the system in a first correct polarity. The other switch is actuable to interconnect the batteries in correct polarity when the jumper cables are connected to the system in a second incorrect polarity.

The switches are provided with operating handles which are normally locked in latched positions which prevent switch actuation. A circuit means senses whether the jumper cables are connected in correct or incorrect polarity, and momentarily energizes a solenoid which unlatches or releases the handle of the switch which will insure battery interconnection of correct polarity. The handle of the unlatched switch is then moved from the unlatched position to a closed position which completes interconnection of the two batteries.

The momentarily energized solenoid is disabled when the associated switch handle moves from the latched to the unlatched position. Apart from manual actuation of the selected high-current switch, system operation is automatic upon connection of the jumper cables. If systems of the invention are installed in vehicles in which both the charged and discharged batteries are located, a separate pushbutton switch is momentarily depressed to initiate the unlatching operation in both systems.

DETAILED DESCRIPTION OF THE PREFERRED EMBODIMENT

Figure 1:
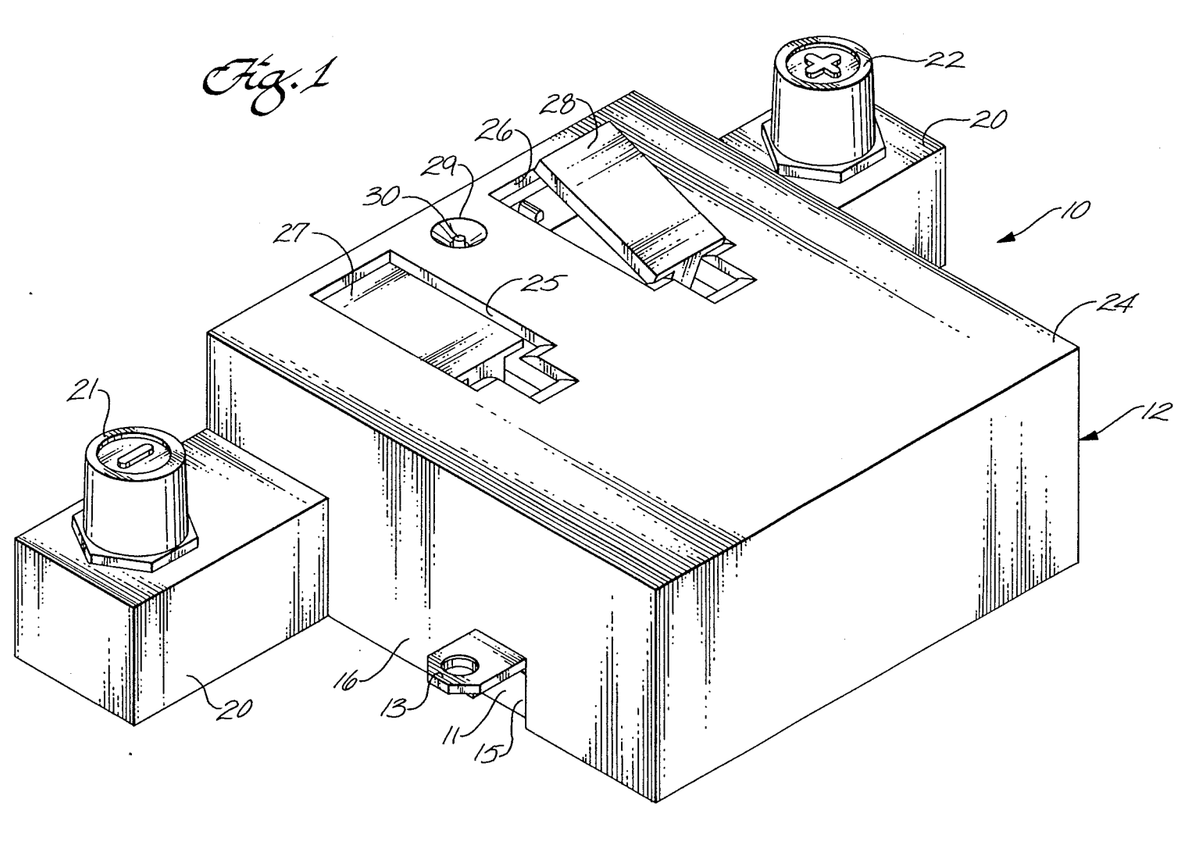
FIG. 1 is a pictorial view of a switching system according to the invention.
Figure 2:
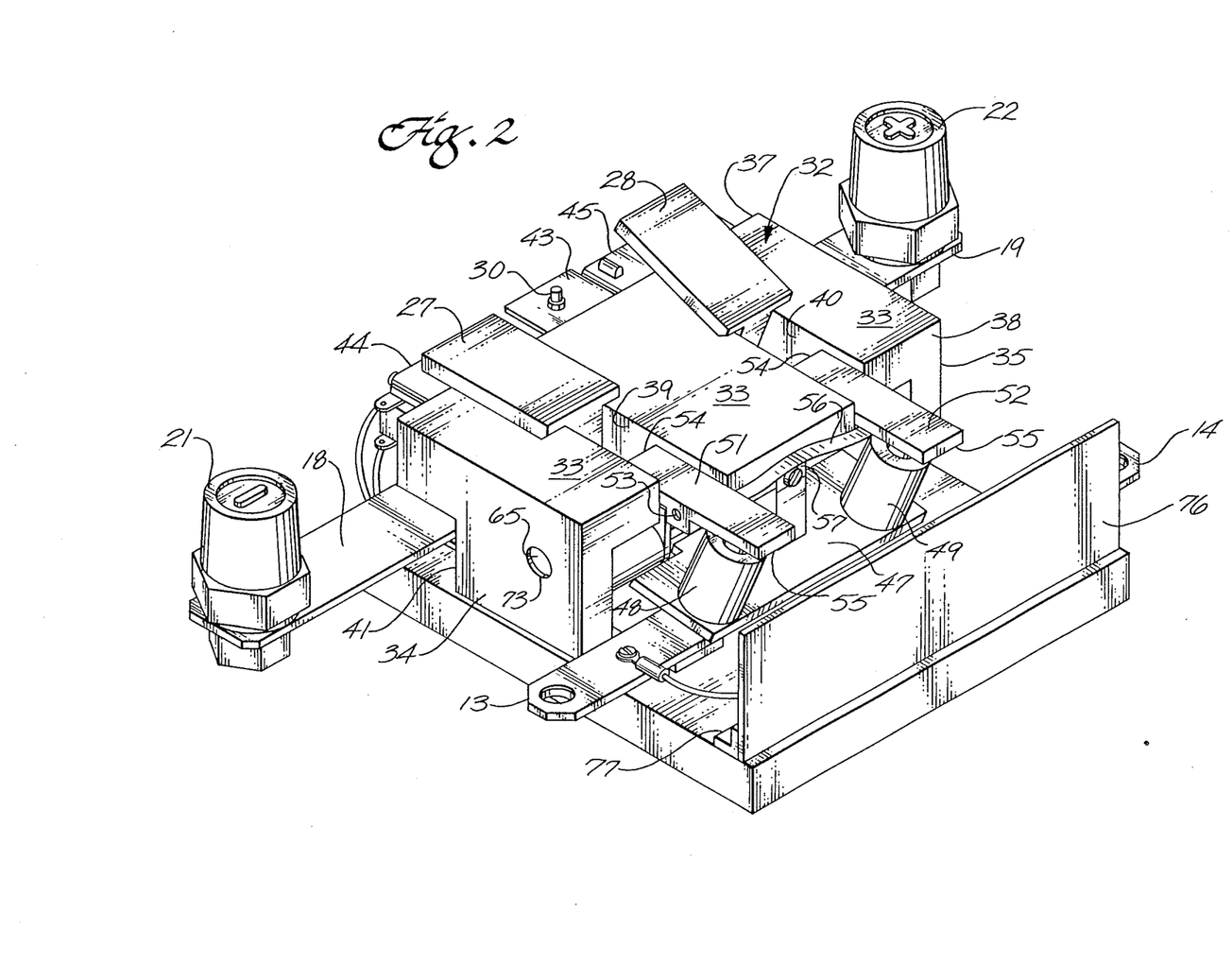
FIG. 2 is a view similar to FIG. 1, but showing the system after removal of a protective cover.

A jumper-cable switching system 10 according to the invention is shown in FIGS. 1 and 2 and includes a rigid insulating baseplate 11, over which is secured a housing cover 12 of rigid plastic material. The assembly is configured for permanent installation in the engine compartment of a vehicle, or may also be located in the rear of the vehicle adjacent a battery mounted in a trunk or luggage compartment.

A first pair of heavy metal terminals 13 and 14 extend oppositely from openings 15 in sidewalls 16 of cover 12 for permanent connection to cables (not shown) extending to the vehicle battery. A second pair of heavy metal terminals 18 and 19 (FIG. 2) extend from baseplate 11 beneath protective insulated extensions 20 of the cover. Terminals 18 and 19 support connection posts 21 and 22 on which alligator clips or similar clamps of conventional jumper cables (not shown) can be secured. Clips on the remote ends of the jumper cables are connected to the battery of a second vehicle.

A top wall 24 of cover 12 defines a pair of spaced-apart and generally rectangular openings 25 and 26 in which are positioned a pair of switch operating handles 27 and 28. Handle 27 is shown in FIGS. 1-2 in a normal fully depressed and latched position, and handle 28 is shown in a partly elevated and unlatched position in preparation for engagement of a switch as described below. When the system is not in use, both handles are fully depressed beneath the top surface of the cover, and cannot be grasped for movement. Top wall 24 also has a small circular opening 29 which exposes a pushbutton switch 30, the function of which will be later described.

Referring to FIG. 2 showing the system with cover 12 removed, an integrally formed mounting block 32 which may be machined from metal, or made of a strong and rigid plastic material, provides a mounting frame for a number of the system components. The mounting block has a top wall 33, a pair of depending end walls 34 and 35, a depending central wall 36 (FIG. 3), a front surface 37, and a rear surface 38. The mounting block is rigidly secured by screws (not shown) extending from baseplate 11 into threaded openings in the undersurface of walls 34–36.

Top wall 33 defines a pair of slots 39 and 40 therethrough to receive elements associated with handles 27 and 28, and the slots extend from rear surface 38 to terminate short of front surface 37. A clearance opening 41 is provided in each of end walls 34 and 35 so the mounting block does not make electrical contact with terminals 18 and 19, and terminals 13 and 14 are similarly spaced from the block.

Switch 30 is supported on a bracket 43 (FIG. 2) secured to the upper central part of front surface 37 of the mounting block. A pair of spaced-apart SPST switches 44 and 45 of the "Microswitch" type are secured to front surface 37 immediately beneath handles 27 and 28 respectively. Each of switches 44 and 45 is positioned to be activated and closed when the associated handle is in a fully depressed and latched position, and to be released and open when the associated handle is unlatched and raised away from the fully depressed position.

A solenoid-supporting base or bracket 47 is secured to mounting block 32 to extend rearwardly and slightly downwardly from rear surface 38. A pair of iron-core solenoid coils 48 and 49 are secured at opposite ends of bracket 47 to extend upwardly therefrom. The solenoid coils are aligned fore and aft with handles 27 and 28 respectively as shown in FIG. 2.

Figure 3:
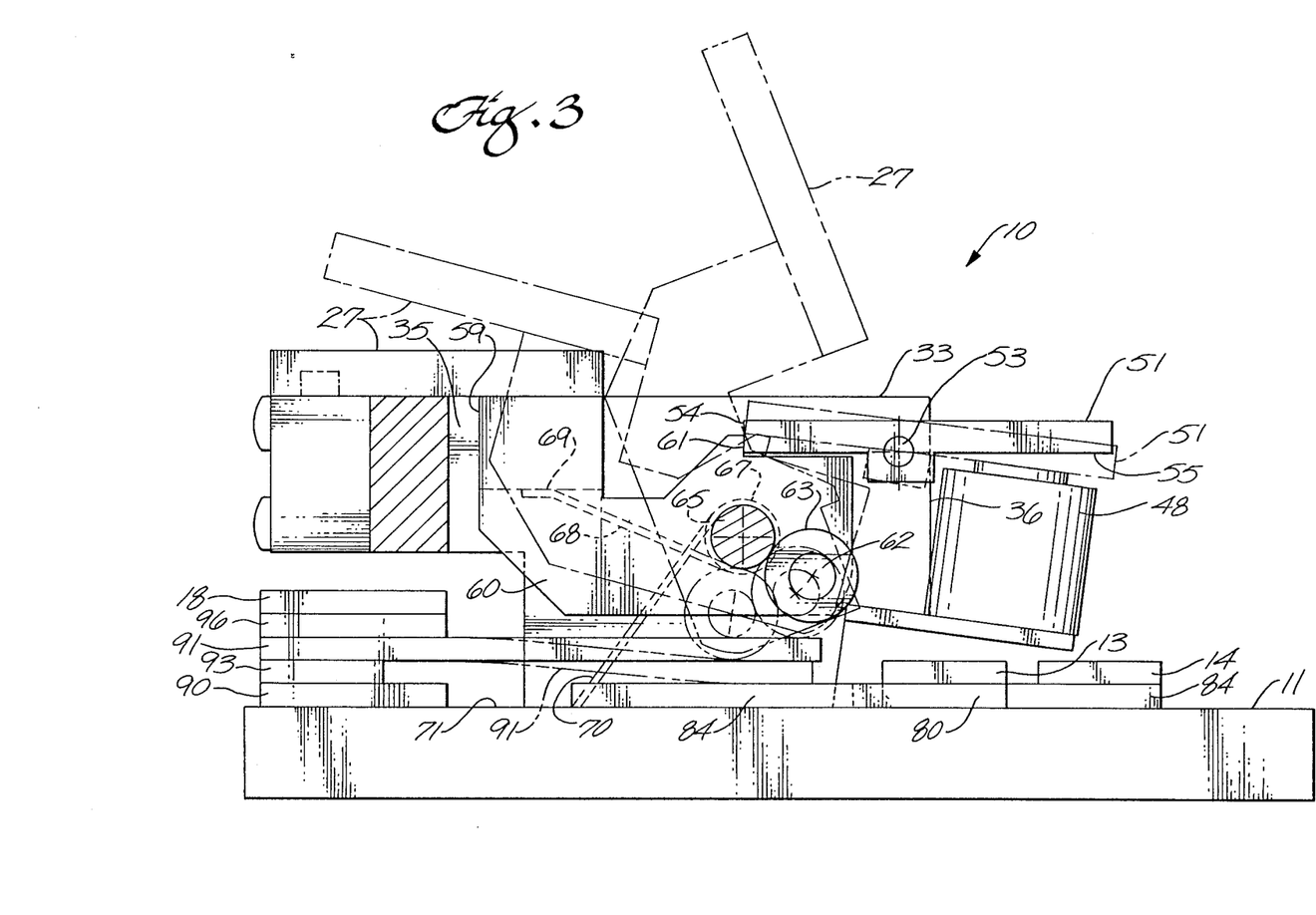
FIG. 3 is a side view of the system, partly in section, and showing a switch assembly in a fully depressed "off" condition in solid line, an unlatched position in dashed line, and a fully activated "on" position in double-dashed line.

A pair of magnetic-metal barlike pawls 51 and 52 are rotatably mounted on a shaft 53 which extends through and is secured to the upper-central part of mounting block 32 slightly forward of rear surface 38. Each of the seesaw-like pawls has a forward portion within slots 39 or 40 and having a squared-off latching end 54 which extends perpendicularly to the flat upper and lower pawl surfaces. As shown in FIG. 3, each pawl is movable between a first generally horizontal latched position (shown in solid line), and a second inclined unlatched position (shown in dashed line) in which a pawl rear undersurface 55 is drawn against the upper end of the associated solenoid coil to raise latching end 54.

A leaf spring 56 is secured by a central bracket 57 to the rear central surface of mounting block 32, and the oppositely extending arms of the leaf spring are compressed beneath the respective pawls 51 just behind shaft 53 and forwardly of the upper ends of the solenoid coils. The restoring force exerted by the arms of spring 56 tends to rotate the pawls counterclockwise as seen in FIG. 3, and thereby urges the pawls to a generally horizontal position.

Figure 4:
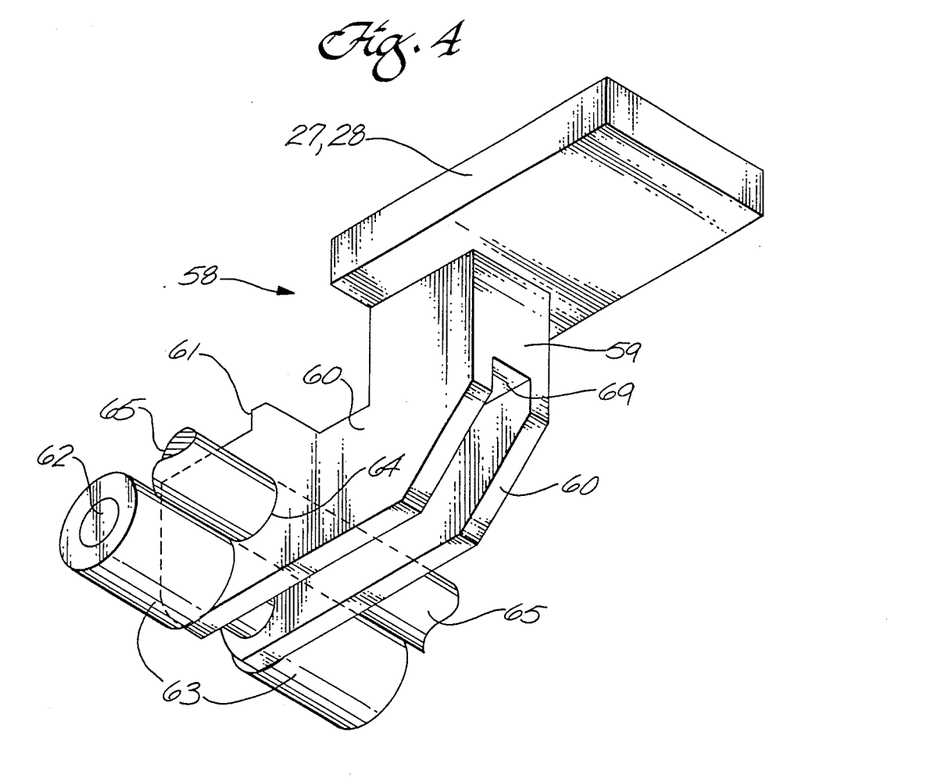
FIG. 4 is a pictorial view of a switch assembly.
Figure 5:
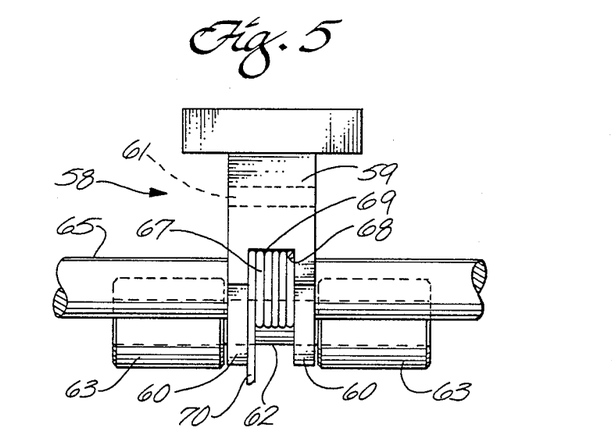
FIG. 5 is a front view of the switch assembly.

Each of handles 27 and 28 is a component of a pair of switch activating assemblies 58 used in system 10 and best seen in FIGS. 4–5. A bifurcated link 59 is integrally formed with the rear undersurface of each handle. Link 59 extends downwardly and rearwardly from the handle within a respective one of slots 39 and 40 to define a pair of parallel and spaced-apart sideplates 60. An upper rear surface of each sideplate 60 is recessed to define a pawl-engaging shoulder 61.

A roller-mounting shaft 62 is secured to and extends through sideplates 60, and a pair of switchactuating rollers 63 (made of a nonconductive plastic) are rotatably mounted on the shaft on opposite sides of the outer surfaces of the sideplates. A cylindrical bore 64 extends through the sideplates to receive an assembly mounting shaft 65 which makes a slip fit within the bore. The concentric axes of bore 64 and shaft 65 are parallel to the axis of roller-mounting shaft 62.

A helical torsion spring 67 (FIG. 5) is loosely fitted over shaft 65 between sideplates 60. A first end 68 of the spring extends tangentially away from the spring central coil to abut an undersurface 69 of link 59 between the forward ends of the link sideplates. A second end 70 of the spring extends tangentially away from the central coil to be urged against an upper surface 71 of baseplate 11 as shown in FIG. 3. In this condition, the spring is tensioned or activated to urge link 59 to rotate clockwise (as seen in FIG. 3), and thereby to raise the associated handle 27 or 28 out of the fully depressed latched position toward the partially raised unlatched position.

During assembly, the two switch activating assemblies with springs 67 are fitted within slots 39 and 40 respectively of mounting block 32. Assembly mounting shaft 65 is then press-fitted into bore 64 to make the activating assemblies rotatable captive with the mounting block.

An electrical-component mounting panel 76 is supported on the upper rear surface of baseplate 11 by brackets 77. Panel 76 is preferably of a conventional printed-wiring-board style with the various electrical components described below mounted on its front or inner surface.

Figure 6:
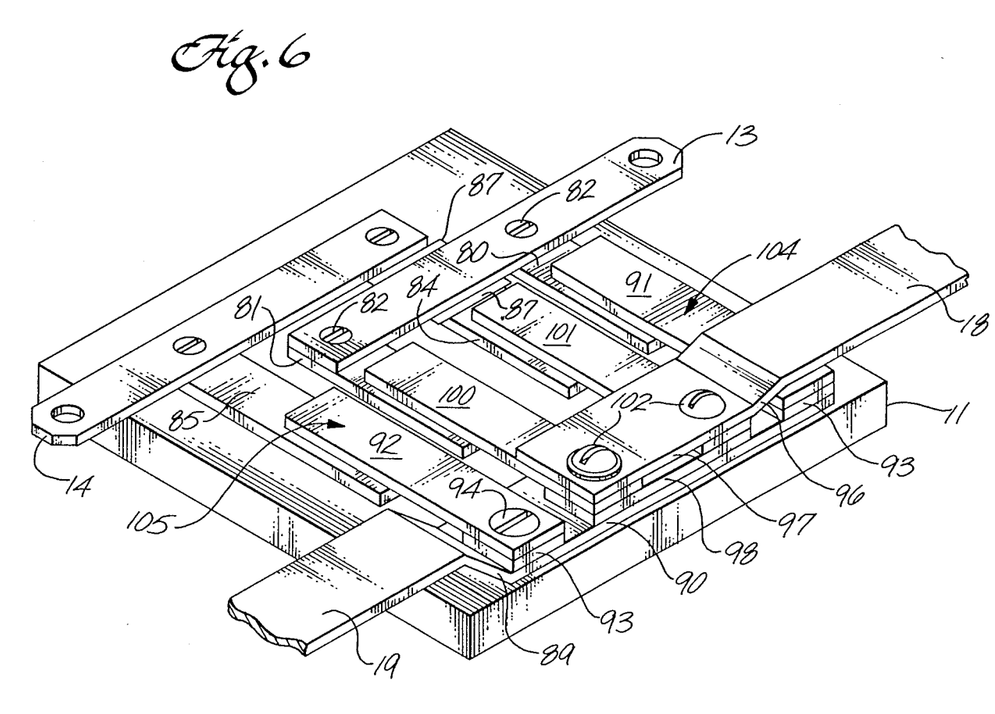
FIG. 6 is a pictorial view showing an array of fixed and movable contact bars on a baseplate of the system.

Referring to FIG. 6, the upper surface of baseplate 11 supports a plurality of interdigitated fixed and resiliently movable conductive bars which form high-current switches for system 10. A first pair of laterally spaced fixed-contact bars 80 and 81 are rigidly secured to the baseplate upper surface to extend forwardly from terminal 13, and the bars are electrically and mechanically connected to terminal 13 by screws 82. Similarly, a second pair of fixed contact bars 84 and 85 are mounted on the baseplate, and extend forwardly from screwed electrical and mechanical connections to terminal 14.

Fixed-contact bars 80 and cabling 84 are adjacent each other, and they are permanently connected by terminals 13 and 14 respecively by cables (not shown) to the vehicle battery terminals. Fixed-contact bars 81 and 85 are similarly adjacent, and are permanently connected to the vehicle battery through terminals 13 and 14 by cabling. A sheet of insulating plastic 87 is preferably positioned between the crossing portions of terminal 13 and bar 84 to prevent any electrical connection on these components.

Terminal 19 (supporting post 22 for jumper-cable connection to a remote battery) has a downwardly angled portion 89, and a flat portion 90 secured to and extending along the upper forward surface of baseplate 11. A first pair of cantilevered and resilient movable contact bars 91 and 92 are supported on conductive spacers 93, and the spacers and front ends of bars 91 and 92 are rigidly secured electrically and mechanically to flat portion 90 of terminal 19 by screws 94. The rearwardly extending cantilevered ends of bars 91 and 92 are positioned over and normally spaced above fixed-contact bars 80 and 85 respectively.

Terminal 18 extends inwardly over and is spaced above contact bar 91 to a downwardly angled portion 96, and a flat portion 97 positioned between and spaced from contact bars 91 and 92. A rectangular insulating plate 98 is disposed below flat portion 97 against the upper central surface of flat portion 90 of terminal 19. Sandwiched between the undersurface of flat portion 97 and the upper surface of insulting plate 98 are a second pair of cantilevered and resilient movable contact bars 100 and 101 which extend rearwardly over and normally spaced from fixed-contact bars 81 and 84 respectively. Flat portion 97, bars 100 and 101, and insulating plate 98 are secured to baseplate 11 by screws 102 which pass through clearance openings and insulating bushings (not shown)in underlying flat portion 90 of terminal 19.

This assembly of fixed and movable contact bars forms a pair of double-pole single-throw switches 104 and 105 (FIGS. 6 and 7) which are independently actuable to connect the vehicle battery to a remote battery in correct polarity without regard to the manner in which the jumper cables are connected to the remote battery and connection posts 21 and 22. Switch 104 comprises adjacent fixed contacts 80 and 84 connected to the vehicle battery in a known polarity, and movable contacts 91 and 101 connected to the remote battery in a first arbitrary polarity. Switch 105 comprises adjacent fixed contacts 81 and 85 of known polarity, and movable contacts 92 and 100 connected to the remote battery in a second polarity opposite to the first arbitrary polarity.

Figure 7:
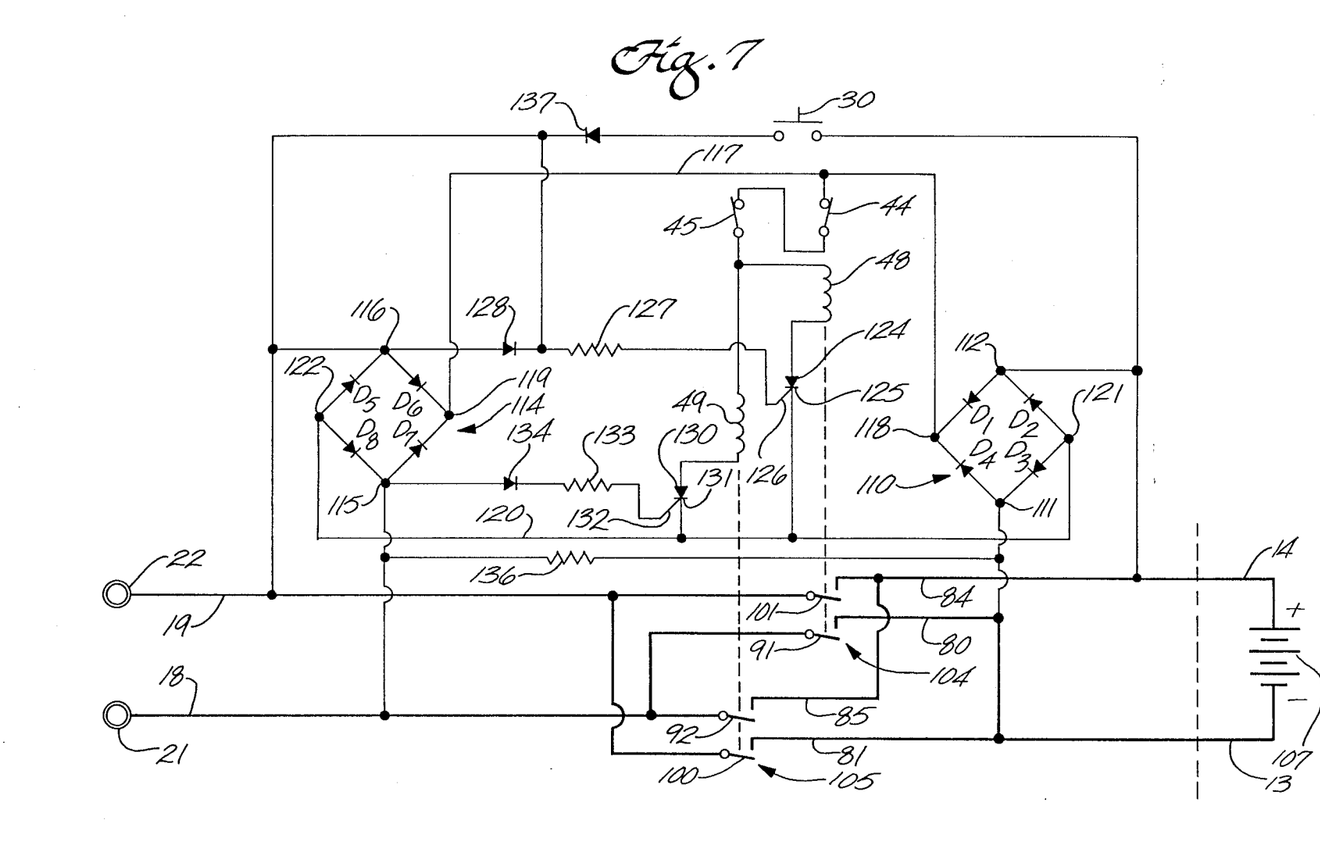
FIG. 7 is a schematic electrical circuit diagram of the system.

The schematic drawing of FIG. 7 shows the polarity-sensing and interconnection circuitry of system 10. A battery 107 of the vehicle in which system is installed has a positive terminal permanently cabled to terminal 14, and a negative terminal permanently cabled to terminal 13. The interconnection of terminals 13-14 and 18-19 with switches 104 and 105 is as already above described.

A first diode bridge assembly 110 with diodes $D_1$-$D_4$ connected in conventional Wheatstone bridge fashion has a pair of opposed terminals 111 and 112 connected across battery 107 to terminals 13 and 14 respectively. A second diode bridge assembly 114 with diodes $D_5$-$D_8$ similarly connected has a pair of opposed terminals 115 and 116 connected across the remote battery terminals. A lead 117 connects third terminals 118 and 119 of the two bridges, and another lead 120 connects remaining terminals 121 and 122 of the bridges.

Switches 44 and 45 are series connected between lead 117 and one end of each of solenoid coils 48 and 49. The remaining end of solenoid coil 48 is connected to a conductive terminal 124 of a controllable switching means such as a conventional silicon controlled rectifier or SCR. A second conductive terminal 125 of the SCR is connected to lead 120, and a control terminal (gate) 126 of the SCR is connected through a current-limiting resister 127 and diode 128 to terminal 116 of diode bridge 114. The remaining end of solenoid coil 49 is similarly connected to a first conductive terminal 130 of a second SCR (or comparable switching element) having a second conductive terminal 131 connected to lead 120, and a control terminal 132 connected through a resistor 133 and diode 134 to terminal 115 of diode bridge 114.

A current-limiting resistor 136 is connected between terminals 111 and 115 of the two diode-bridge assemblies. Normally open pushbutton switch 30 is connected in series with a diode 137 between terminals 112 and 116 of the bridge assemblies. Switch 30 is used only in a situation where both battery 107 and the remote battery are in vehicles which are both equipped with respective systems 10.

The operation of system 10 is best described in terms of three conditions or modes. The first mode is when the system is inoperative and not in use. The second mode is when jumper cables have been connected between the remote battery and posts 21 and 22, resulting in a visual signal to the user as to which of high-current switches 104 and 105 is to be manually actuated. The third mode is when the indicated one of switches 104 and 105 is closed to interconnect the two batteries in correct polarity.

In the first inoperative mode, the system components are positioned as shown in solid line in FIG. 3. Both handles 27 and 28 are latched down and fully depressed beneath the upper surface of cover 12 within openings 25 and 26 so they cannot be grasped. The latched condition is maintained by pawls 51 and 52 which are urged counterclockwise into a generally horizontal position by leaf spring 56 to engage and seat latching ends 54 against shoulders 61 and the upper rear surfaces of sideplates 60. When so latched, handles 27 and 28 cannot be raised, because rotational movement is prevented by the abutment of pawl latching ends 54 and shoulders 61.

System 10 is useful when the dead battery to be "jumped" is either battery 107 in the vehicle with the system, or a remote battery in another vehicle. In either case, conventional jumper cables are connected from the terminals of the remote battery to posts 21 and 22, and without attention to or concern about achieving an inter-battery connection of correct polarity (plus to plus, and minus to minus).

Assume battery 107 is discharged, and a remote battery is connected with the positive cable to post 22 and the negative cable to post 21. Current then flows through diode 128 and resistor 127 to gate electrode 126 (the return path being through diode $D_8$ to negative post 22) to gate the associated SCR on. This energizes solenoid coil 48 (from positive lead 117 through closed switches 44 and 45, the SCR and diode $D_8$), causing undersurface 55 of pawl 51 to snap down against the solenoid coil, and thereby rotating the pawl so latching end 54 is raised above shoulder 61 to unlatch handle 27 is raised to the partially raised position (shown in broken line in FIG. 3) as link 59 rotates responsive to the restoring force exerted by torsion spring 67. Upward movement of the handle disconnects switch 44, and thereby terminates further current flow through coil 48 to prevent overheating.

If the jumper cables are reversed (positive to post 21 and negative to post 22) current will flow to gate electrode 132 through diode 134 and resistor 133, causing conduction through the associated SCR, energization of coil 49, and unlatching of switch 105. Upward movement of handle 28 to the unlatched position turns off switch 45 to terminate further current flow to the coil, the function of which is completed upon unlatching rotation of associated pawl 52.

In either case, only one of switches 104 and 105 will be unlatched, and that switch will provide correct connection of the batteries when actuated. The partially raised position of the unlatched switch gives the user a clear visual signal as to which switch to actuate, and inadvertent actuation of the incorrect switch is prevented by both the recessed position of the associated handle, and by the latched pawl which prevents rotation of the associated link 59.

As can be seen from the circuit diagram of FIG. 7, the system operates in a generally corresponding fashion if battery 107 is charged, and the remote battery is discharged. Only a very small current is drawn from the discharged battery to gate on the appropriate SCR, and to energize the appropriate solenoid coil which unlatches the switch which will assume battery interconnection of correct polarity. Current to coil 48 or 49 is this operating condition is drawn from charged battery 107 through diode $D_1$, and with a return path through diode $D_3$. If both vehicles are equipped with systems 10, momentary closure of switch 30 in the system in the charged-battery vehicle will cause unlatching of the appropriate handle in each system to insure correct battery interconnection without regard to positioning of the jumper cables.

As shown in broken line in FIG. 3, rollers 63 of the unlatched switch assembly rest lightly on the upper surfaces of the associated underlying movable switch contacts 91 and 101, and the relatively light force exerted by torsion spring 67 is insufficient to bend the movable contacts downwardly. At this point, the third operating mode of the system is achieved by raising the handle of the unlatched assembly, and thereby rotating the switch assembly to a fully raised position shown in double-dashed line in FIG. 3.

As the handle is so raised, rollers 63 are driven downwardly against and forwardly along the associated movable contact bars which flex downwardly into intimate contact with the underlying fixed contact bars to close associated switch 104 or 105, and thereby to interconnect the batteries. Further upward movement of the handle is stopped when the upper surfaces of side plates 60 abut latching end 54 of the associated pawl 51 or 52. The switch assembly is self locking in this position because rollers 63 have moved "over center" slightly forwardly of a vertical plane through the centerline of shaft 65.

The disabled vehicle is then started, and the jumper cables are removed. The fully raised switch handle is then rotated back to the recessed and fully depressed position to open associated switch 104 or 105. The depressed handle is re-latched when springurged pawl 51 or 52 snaps into position with latching end 54 abutting shoulder 61. A hinged lid (not shown) may be provided on cover 12, and closure of the lid will insure that the previously raised handle is moved to the fully depressed and latched position.

There has been described an electromechanical jumper-cable interconnection system which is well suited to permanent installation in a vehicle, and which provides automatic signaling to the user as to which of two high-current switches is to be activated. The user is freed of concern over proper positioning of the jumper cables which can be arbitrarily connected between the vehicles. The overheating problem of high-current starter relays is eliminated, and the system enables safe and effective interconnection of the batteries through rugged, mechanically actuated switches.

What is claimed is:

1. A switching system for interconnecting first and second batteries through jumper cables which can be connected to the system in a first correct polarity and a second incorrect polarity, comprising;
   a first manual switch means arranged to connect the batteries in correct polarity when the jumper cables are connected in the first correct polarity;
   a second manual switch means arranged to connect the batteries incorrectly polarity where the jumper cables are connected in the second incorrect polarity;
   means latching each of the first and second switch means in an open position in which battery interconnection is prevented;
   circuit means for sensing the polarity in which the jumper cables are connected, and including an unlatching means for each switch means, the circuit being arranged to actuate the unlatching means which will enable one of the switching means to be manually actuated to a closed position to interconnect the batteries in correct polarity.

2. The system defined in claim wherein each switch means has a latched position in which the switch means is open, an unlatched position in which the switch means is open, and an actuated position in which the switch means is closed.

3. The system defined in claim 2 wherein a selected one of the switch means is moved to the unlatched position upon connection of the jumper cables to be thereafter manually moved to the actuated position.

4. The system defined in claim 3 wherein each unlatching means includes a solenoid connected to the circuit means, and a mechanical latch which is movable responsive to actuation of the solenoid to unlatch the associated switch means.

5. The system defined in claim 4 wherein each switch means includes a solenoid-disabling switch connected to the circuit means and which is closed to enable actuation of the solenoid when the switch means is in the latched position, and open to disable solenoid actuation when the switch means is in either of the unlatched and actuated positions.

6. The system defined in claim wherein movement of the selected switch means to the unlatched position provides a visual signal as to which switch means is to be moved to the actuated position.

* * * * *

UNITED STATES PATENT AND TRADEMARK OFFICE
CERTIFICATE OF CORRECTION

PATENT NO. : 4,972,135

DATED : November 20, 1990

INVENTOR(S) : Bobby L. Bates; Wesley V. Bates

It is certified that error appears in the above-identified patent and that said Letters Patent is hereby corrected as shown below:

In the Claims:

Column 8, line 18, after "batteries" change "incorrectly" to -- in correct --.

Column 8, line 18, after "polarity" change "where" to -- when --.

Column 8, line 31, after "claim" and before "wherein" insert -- 1 -- .

Signed and Sealed this

Twelfth Day of May, 1992

Attest:

DOUGLAS B. COMER

Attesting Officer

Acting Commissioner of Patents and Trademarks